Oct. 29, 1957

A. H. WILKINSON 2,811,322

CABLE WINDING CLAMPING APPARATUS

Filed Dec. 14, 1953

INVENTOR.
A. H. Wilkinson
BY
C. M. McKnight
ATTORNEY

United States Patent Office 2,811,322
Patented Oct. 29, 1957

2,811,322

CABLE WINDING CLAMPING APPARATUS

Alvin H. Wilkinson, Tulsa, Okla., assignor, by mesne assignments, to Cabot Shops, Inc., Boston, Mass., a corporation of Massachusetts Application December 14, 1953, Serial No. 397,870

1 Claim. (Cl. 242—117)

This invention relates to improvements in cable winding drums and more particularly, but not by way of limitation, to an improved cable winding drum flange and clamp.

In using the usual cable winding drum, one end of a cable is secured to one of the brake flanges by a cumbersome clamping device. The cable is then laid out or held in a direction at right angles to the drum; whereupon the drum is rotated to wind the cable thereon. The clamp usually interferes with the winding of the cable, particularly the first wind, and a separate clamp is required for each size of cable wound on the drum.

The present invention contemplates a drum flange on one end of a cable winding drum core grooved to receive the dead or non-working end of a cable being wound on the core. A novel clamp is disposed in one end of the groove to secure variable sizes of cables in the groove. The clamp is constructed to be inserted in the drum flange flush with the inner face thereof and rotatably adjustable to receive different sizes of cables and clamp them to the drum flange.

An important object of this invention is to provide a single clamp on a cable winding drum for securing variable sizes of cable on the drum.

Another object of this invention is to provide a novel cable clamp which will eliminate slipping or chafing of a cable as it is being wound on a drum core.

A further object of this invention is to provide a novel drum flange and cable clamp easily adaptable to receive various sizes of cables.

A still further object of this invention is to provide a drum flange and cable clamp which are simple in construction and may be economically manufactured.

Other objects and advantages of the invention will be evident from the following detailed description, read in conjunction with the accompanying drawings, which illustrate my invention.

Figure 1:
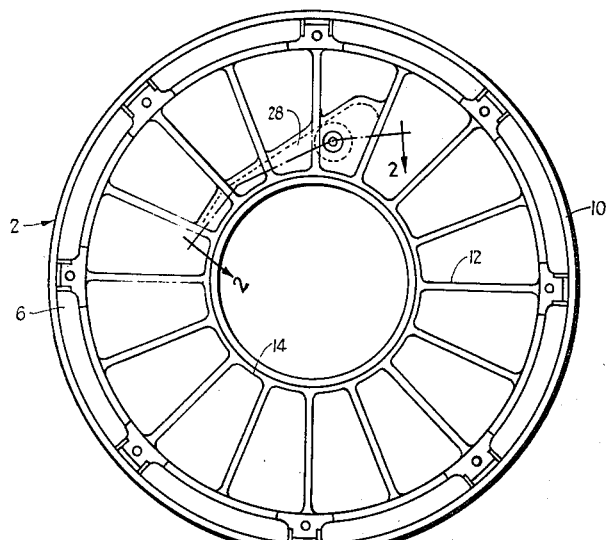
Figure 1 is an elevational view of the outer face of a novel drum flange.
Figure 6:
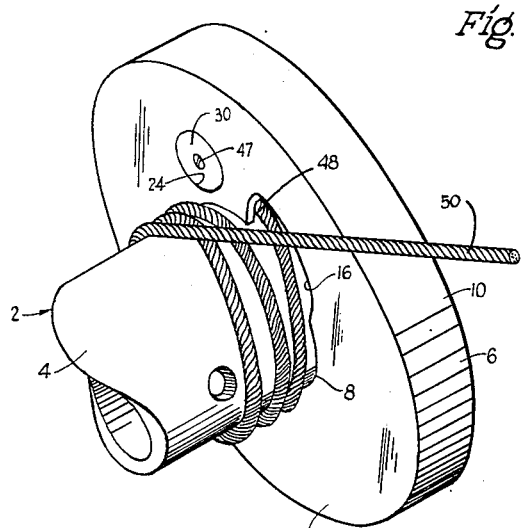
Figure 6 is a fragmentary perspective view of a cable winding drum utilizing my novel clamp and having a cable wound thereon.

Referring to the drawings in detail, and particularly Fig. 6, reference character 2 generally designates a cable winding drum having a cylindrical drum core 4 with a circular brake flange 6 on one end 8 thereof. The drum 2 is supported (not shown) to rotate about the center line of the core 4 in the usual manner. The flange 6 is provided with the usual outwardly extending flange 10 (Fig. 1) on the outer periphery thereof to accommodate a brake band (not shown). Web type braces 12 extend inwardly from the circumferential flange 10 along the outer face of the drum flange 6 and terminate in a hub portion 14.

Figure 2:
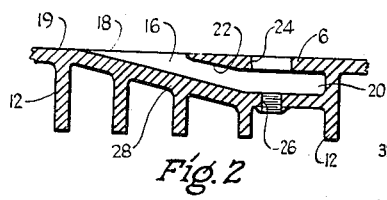
Figure 2 is a cross sectional view taken along lines 2—2 of Fig. 1.

As shown in Fig. 2, the drum flange 6 is deformed outwardly around a portion of the hub 14 to provide a groove 16 formed on the arc of a circle concentric with the outer periphery of the drum core 4. The groove 16 progresses outwardly at 18 from the inner face 19 of the flange 6 toward the end 20 thereof. The main body portion of the drum flange 6 overlaps the groove 16 from the end 20 thereof through approximately one-half the length of the groove 16. A taper 22 is formed on the drum flange 6 in the same direction as the groove 16 and in effect, forms one side of the groove 16. An aperture 24 is formed in the flange 6 and provides communication from the inner face 19 of the flange 6 to the groove 16 in proximity with the end 20 thereof. Another aperture 26 is provided in the deformed portion 28 of the flange 6 in alignment with the aperture 24. The aperture 26 is threaded for purposes as will be hereinafter set forth.

Figure 3:
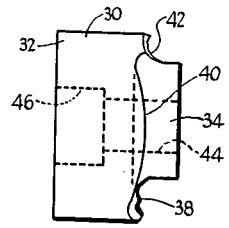
Figure 3 is a side elevational view of a novel cable clamp.
Figure 4:
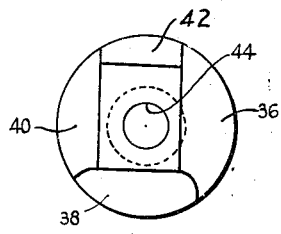
Figure 4 is an end view of the clamp shown in Fig. 3.
Figure 5:
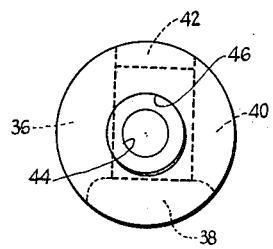
Figure 5 is an elevational view of the opposite end of the clamp shown in Fig. 3.

A novel clamp 30 (Figs. 3–5) is provided for insertion in the aperture 24. The clamp 30 is generally circular in configuration and the head portion 32 thereof has an outer diameter of a size to provide a tight fit in the aperture 24. An extension 34 projects from the head portion 32 and is formed by four cut-away portions 36, 38, 40 and 42. The cut-away portions or grooves 36 to 42 are formed generally on the arc of a circle transversely of the clamp 30 and vary in size to receive and clamp various sizes of cables as will be hereinafter set forth. A bore 44 extends longitudinally through the center of the clamp 30 and has a counter-bore 46 formed concentrically therewith in the head portion 32. The bore 44 and counter-bore 46 are provided to receive a set screw 47 (Fig. 6) which threads into the aperture 26 and secures the clamp 30 in the aperture 24 and groove 16. The clamp 30 is of a length to extend from the inner face 19 of the flange 6 transversely through the groove 16 and position the projection 34 in the groove 16.

Operation

In utilizing the present invention, the dead or non-working end 48 of the cable 50 is threaded into the groove 16 from the end 18 thereof toward the end 20. The clamp 30 is then inserted in the aperture 24 in the proper angular position to clamp the cable end 48 in the groove 16. When using a large cable, the cut-away portion 36 of the clamp 30 is arranged in alignment with the groove 16 to receive and clamp the cable. It will be apparent that the clamp 30 may be rotated upon installation to selectively dispose the cut-away portions 36 to 42 in alignment with the groove 16, depending upon the size of cable being wound upon the drum 2.

After the cable end 48 is secured in the groove 16 by the clamp 30 and screw 47, the remainder of the cable 50 is extended at right angles from the drum 2. Upon rotation of the drum 2, the cable 50 will be wound on the core 4 in the usual manner. However, since the clamp 30 is of a size to fit flush with the inner face 19 of the drum flange 6, it will not interfere with the winding operation and the cable 50 will not be chafed upon winding on the drum core 4. Furthermore, since each of the grooves 36 to 42 has a definite length, the cable 50 will not rotate the clamp 30 in the aperture 24 and will not slip in the groove 16.

From the foregoing, it is apparent that the present invention provides a novel drum flange and single cable clamp for securing various sizes of cables on a drum, thereby eliminating the necessity of a clamp for each size of cable which may be wound on the drum. The drum flange and cable clamp are constructed to provide a smooth inner face of the drum flange to eliminate any possible chafing of a cable as it is being wound onto or from the drum. It is also apparent that the flange and clamp are simply constructed and may be economically manufactured.

Changes may be made in the combination and arrangement of parts as heretofore set forth in the specification and shown in the drawings, it being understood that any modification in the precise embodiment of the invention may be made within the scope of the following claim without departing from the spirit of the invention.

I claim:

In a cable winding apparatus, a brake flange having an arcuate groove in the inner face thereof and progressing in depth along the length thereof for receiving one end of a cable and having a portion overlapping the deep end of the groove, said flange also having a transverse aperture in the overlapping portion communicating with the groove, clamping means for securing a cable in said groove, said clamping means comprising a circular shaped member of a size to enter said aperture, an extension on said member adapted to receive various sizes of cable, said clamping means being of a length to extend from flush with the inner face of the flange transversely through the groove in the flange, and means for securing said clamping means in said aperture whereby the extension of said clamping means extends into the groove in the flange to selectively contact the cable.

References Cited in the file of this patent

UNITED STATES PATENTS

| | | |
|---|---|---|
| 436,192 | Roberts | Sept. 9, 1890 |
| 823,401 | Ferris | June 12, 1906 |
| 1,625,503 | Schooley | Apr. 19, 1927 |
| 2,420,594 | Hall | May 13, 1947 |
| 2,421,788 | Henry | June 10, 1947 |

FOREIGN PATENTS

| | | |
|---|---|---|
| 888,908 | France | June 4, 1945 |